May 13, 1958 W. BAST ET AL 2,834,089
FORM FOR MOLDING QUADRANGULAR OBJECTS
Filed Oct. 14, 1955 4 Sheets-Sheet 1
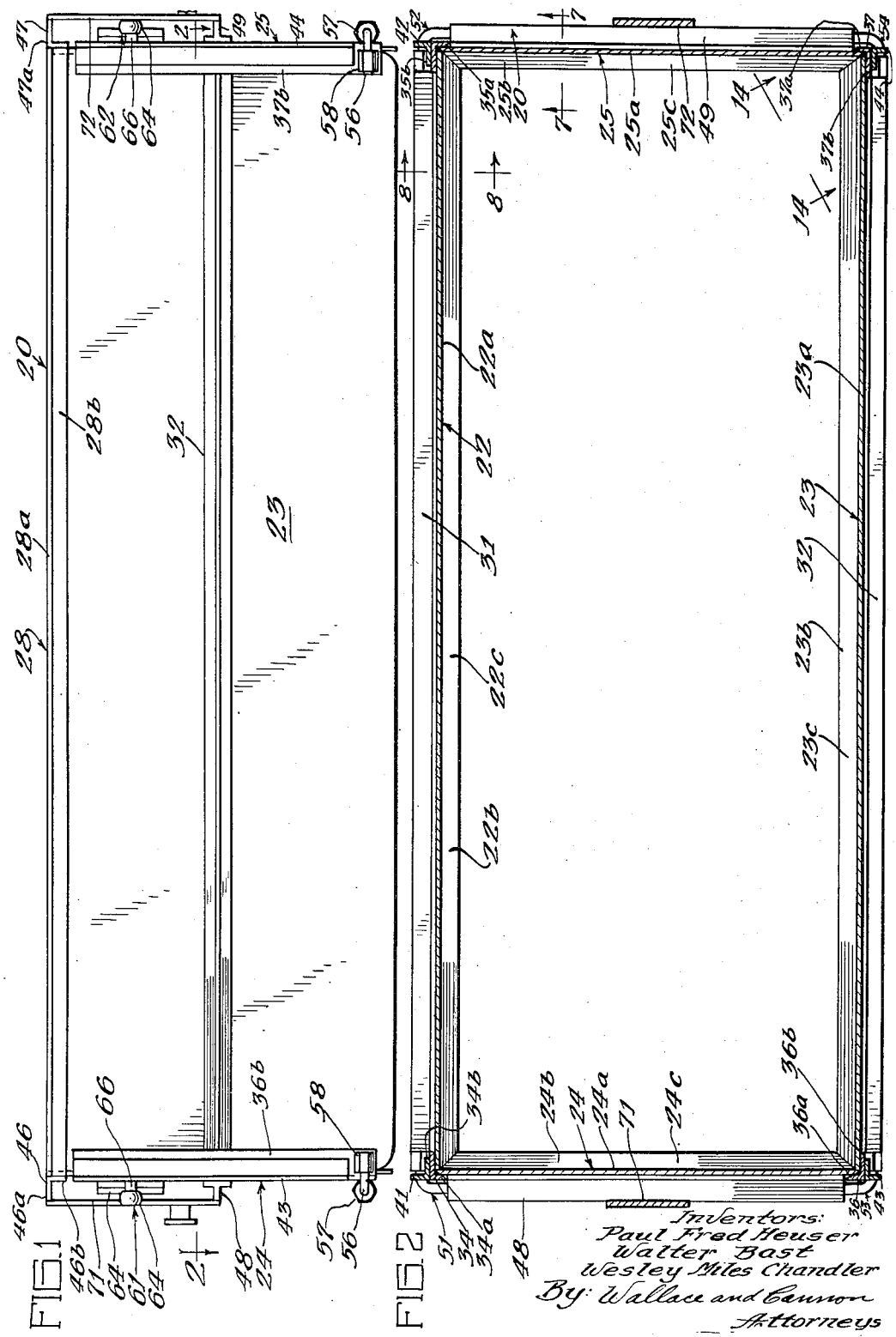
Inventors:
Paul Fred Heuser
Walter Bast
Wesley Miles Chandler
By Wallace and Cannon
Attorneys

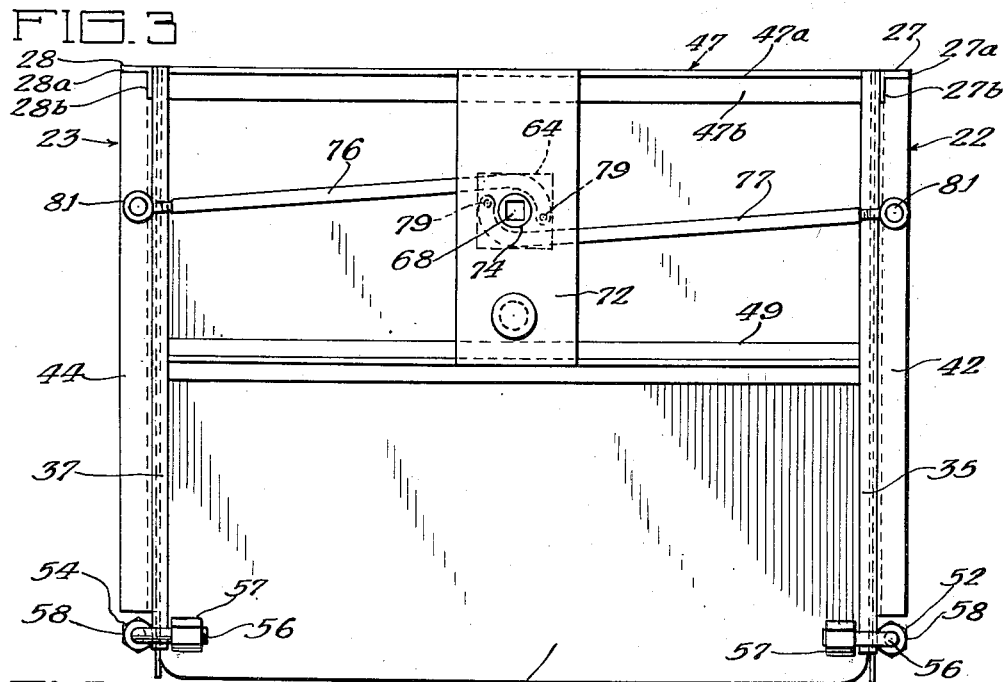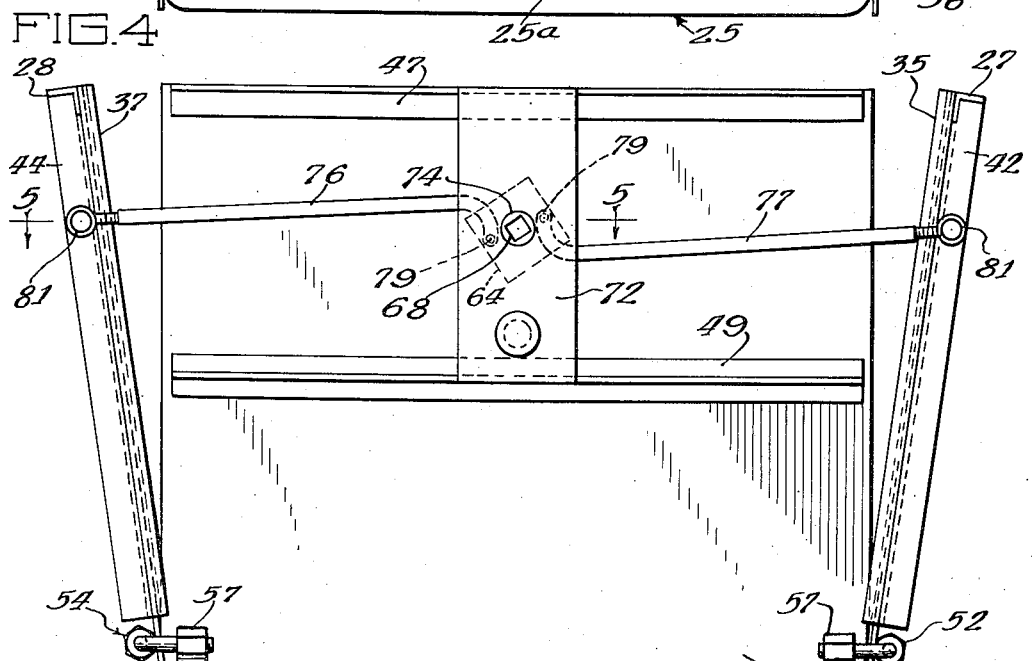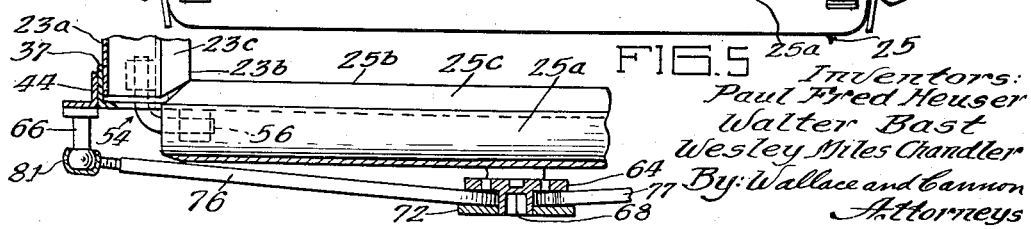

May 13, 1958    W. BAST ET AL    2,834,089
FORM FOR MOLDING QUADRANGULAR OBJECTS
Filed Oct. 14, 1955    4 Sheets-Sheet 3
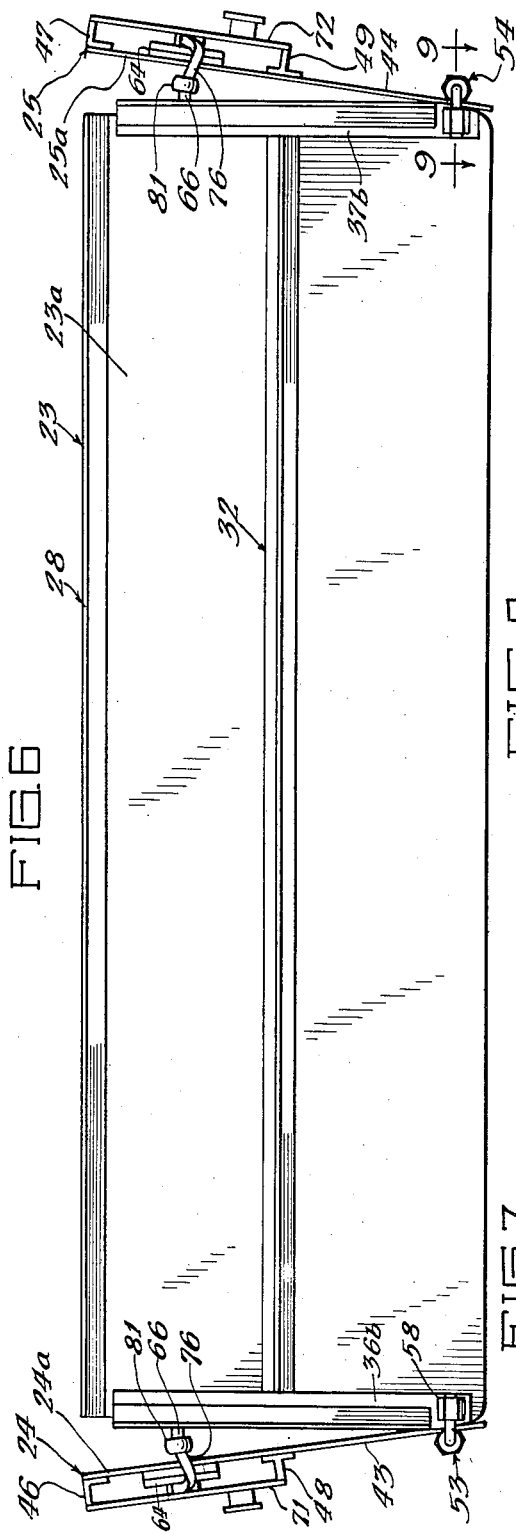
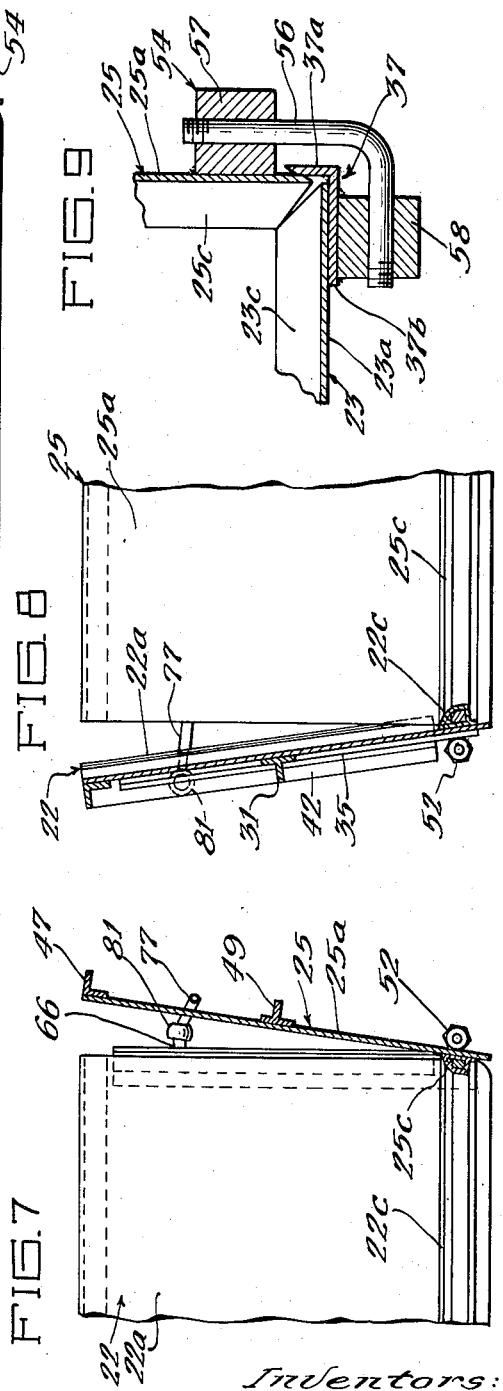
Inventors:
Paul Fred Heuser
Walter Bast
Wesley Miles Chandler
By: Wallace and Cannon
Attorneys

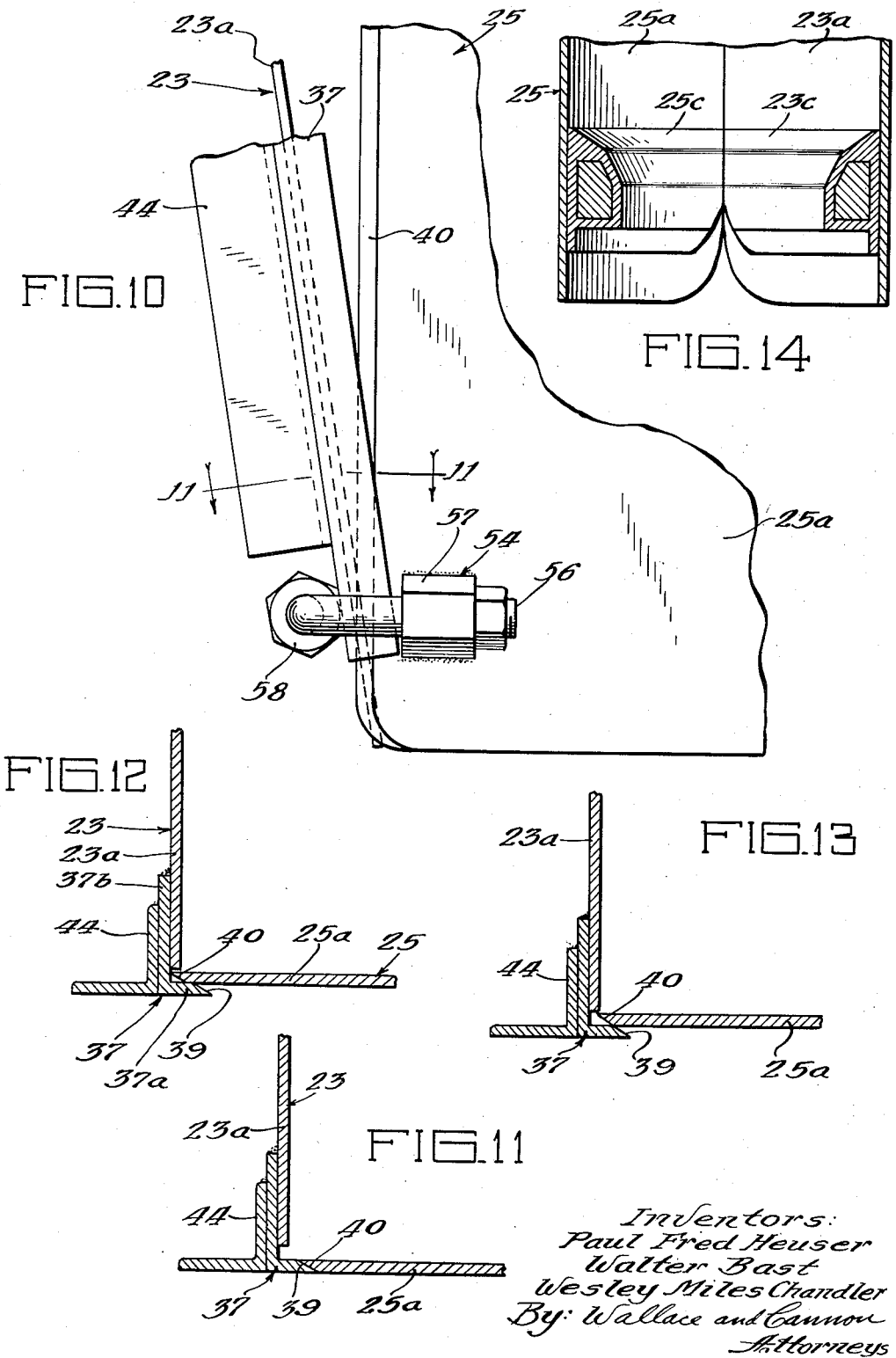

United States Patent Office 2,834,089
Patented May 13, 1958

2,834,089

FORM FOR MOLDING QUADRANGULAR OBJECTS

Walter Bast, Cicero, Ill., and Wesley Miles Chandler and Paul Fred Heuser, St. Paul, Minn., assignors to Wilbert W. Haase Co., Forest Park, Ill., a corporation of Illinois Application October 14, 1955, Serial No. 540,383

4 Claims. (Cl. 25—121)

This invention relates to forms, and, more particularly, to forms which are particularly well adapted for molding burial vaults, septic tanks, hollow blocks, and the like.

It will be understood that reference hereinafter to burial vaults, and the like, is merely by way of illustration and not by way of limitation and that forms embodying the principles of our invention may be constructed and used for forming other articles without departing from the purview of our invention.

A primary object of our invention is to afford a novel form which may be released from burial vaults, or the like, in a novel and expeditious manner.

Another object of our invention is to provide a novel form wherein the walls thereof are movable relative to each other in a novel and expeditious manner.

Another object is to afford a novel form wherein the walls thereof are pivotally attached to each other in a novel and expeditious manner.

A further object of our invention is to afford a novel form embodying walls constituted and arranged in a novel and expeditious manner, whereby certain of the walls may be swung outwardly relative to each other to thereby permit other of the walls to be swung outwardly relative to each other, and the first mentioned walls may be then swung inwardly relative to each other and during such latter movement are effective to cam the aforementioned other walls back toward each other.

Another object of our invention is to afford a novel form wherein walls may be permanently connecetd to each other, and, yet, the form may be pivotably expanded and contracted in a novel and expeditious manner.

Other and further objects of the present invention will be apparent from the following description and claims and are illustrated in the accompanying drawings which, by way of illustration, shows a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a side elevational view of a form embodying the principles of our invention;

Fig. 2 is a longitudinal sectional view taken substantially along the line 2—2 in Fig. 1;

Fig. 3 is an end elevational view of the form shown in Fig. 1;

Fig. 4 is an end elevational view similar to Fig. 3 but with the parts thereof disposed in different positions;

Fig. 5 is a detail sectional view taken substantially along the line 5—5 in Fig. 4;

Fig. 6 is a side elevational view similar to Fig. 1, but with the parts thereof disposed in different positions;

Fig. 7 is a detail sectional view taken substantially along the line 7—7 in Fig. 2, but showing the parts thereof disposed in different positions;

Fig. 8 is a detail sectional view taken substantially along the line 8—8 in Fig. 2, but showing the parts thereof disposed in different positions;

Fig. 9 is a detail sectional view taken substantially along the line 9—9 in Fig. 6;

Fig. 10 is an enlarged detail elevational view of part of the form shown in Fig. 4;

Fig. 11 is a detail sectional view taken substantially along the line 11—11 in Fig. 10;

Fig. 12 is a detail sectional view somewhat similar to Fig. 11 but showing the parts in a different position;

Fig. 13 is a detail sectional view somewhat similar to Figs. 11 and 12 but showing the parts in still different position; and Fig. 14 is a detail sectional view taken substantially along the line 14—14 in Fig. 2.

A form 20, embodying the principles of our invention, is shown in the drawings to illustrate the preferred embodiment of our invention.

The form 20 is particularly well adapted for use as an outer form or outer housing in a burial vault form of the type wherein an outer housing and an inner core are disposed in nested relation to each other, such as, for example, in a form of the type disclosed in the United States Letters Patent application, Serial No. 434,252 filed by Wesley M. Chandler, Paul Fred Heuser, and Kenneth C. Smith, on June 3, 1954 now Patent No. 2,805,462 issued September 10, 1957. It will be appreciated, however, by those skilled in the art that our invention is not rectangular-shaped side walls 22 and 23 normally disposed the principles of our invention may be used for purposes other than the molding of burial vaults.

The form 20, Figs. 1, 2 and 3, is substantially rectangular in shape, and embodies, in general, two substantially rectangular-shaped side walls 22 and 23 normally disposed in upright position in substantially parallel relation to each other, and two substantially square-shaped end walls 24 and 25 also normally disposed in upright position in substantially parallel relation to each other. The walls 22—25 embody, as the main body portions thereof, substantially flat panels 22a, 23a, 24a and 25a, respectively, made of suitable material, such as, for example, sheet steel.

Two elongated bracing members in the form of angle irons 27 and 28, Figs. 1 and 3, extend along the upper longitudinal edges of the panels 22a and 23a, respectively. The angle irons 27 and 28 embody legs 27a and 27b, and 28a and 28b, respectively, and are mounted on the panels 22a and 23a with the legs 27b and 28b disposed in juxtaposition thereto, and with the legs 27a and 28a projecting outwardly therefrom, with the upper faces of the legs 27a and 28a disposed in subtantially horizontal alignment with the upper edges of the panels 22 and 23, respectively, Fig. 3. The side walls 22 and 23 also embody longitudinally extending bracing members in the form of substantially T-shaped angle irons 31 and 32, respectively, disposed in substantially horizontally extending position midway between the upper and lower edges of the side walls 22 and 23, Figs. 1 and 2.

When the walls 22—25 are disposed in normal position, the inner faces of the panels 24a and 25a are disposed in abutting engagement with the end edges of the panels 22a and 23a, Fig. 2, with the vertical edges of the panels 24a and 25a disposed in the same vertical planes as the outer faces of the panels 22a and 23a.

Two elongated cam members in the form of angle irons 34 and 35 are mounted on the panel 22a, Fig. 2. The cam members 34 and 35 have substantially perpendicularly disposed legs 34a and 34b, and 35a and 35b, respectively, and are mounted on the side panel 22a with the legs 34b and 35b thereof disposed in juxtaposition to the outer face of the panel 22a at a respective vertical edge portion thereof, and with the legs 34a and 35a projecting inwardly from the outer face of the panel 22a in spaced relation to the adjacent vertical edge of the panel 22a, Fig. 2. The spacing of the legs 34a and 35a from the respective adjacent vertical edge of the panel 22a is preferably such that the vertical edges of the panels 24a and 25a may be freely, but snugly, disposed between the legs 34a and 35a and the adjacent vertical edges of the panel 22a, respectively, as will be discussed in greater detail presently.

Similarly, elongated cam members 36 and 37 having legs 36a and 36b, and 37a and 37b, respectively, are mounted on the panel 23a with the legs 36b and 37b thereof disposed in juxtaposition to the outer face of the panel 23a, and with the legs 36a and 37a projecting inwardly from the panel 23a in spaced relation to the adjacent end edges of the panel 23a, Fig. 2. The legs 36a and 37a are spaced from the adjacent vertical edges of the panel 23a so as to receive the adjacent vertical edges of the panels 24a and 25a therebetween in freely movable, but snugly fitting relation thereto.

The longitudinal free edge of each of the legs 34a, 35a, 36a, and 37a of the cam members 34—37, is beveled inwardly at an acute angle to the outer face of the respective legs 34a—37a, to thereby afford a cam surface 39, Figs. 2 and 12, on each of the cam members 34—37. The vertical edges of the panels 24a and 25a are beveled outwardly at the same acute angle as the inward angle of the bevel on the respective adjacent legs 34a—37a of the cam members 34—37, to afford a surface 40 for engaging the adjacent one of the cam surfaces 39, Figs. 12 and 14.

Four elongated brace members 41, 42, 43 and 44 are mounted on the cam members 34—37, respectively, in juxtaposition to the outer faces of the legs 34b—37b, respectively.

Two elongated brace members in the form of angle irons 46 and 47 are mounted on the outer faces of the panels 24a and 25a, respectively, along the upper edges thereof. The braces 46 and 47 have perpendicularly disposed legs 46a and 46b and 47a and 47b, respectively, and are disposed on the panels 24a and 25a with the legs 46b and 47b disposed in juxtaposition to the outer face of the panels 24a and 25a, respectively, and with the legs 46a and 47a projecting outwardly from the panels 24a and 25a, with the upper faces of the latter disposed in substantially horizontal alignment with the upper edges of the panels 24a and 25a. Two elongated braces in the form of substantially T-shaped irons 48 and 49 are disposed on the end panels 24a and 25a in substantially horizontally disposed position intermediate of the upper and lower edges of the panels 24a and 25a, Figs. 1, 2 and 3.

When the panel 24a is disposed in abutting upright engagement with the adjacent end edge of the panels 22a and 23a, it is disposed between the respective end edge of the panels 22a and 23a and the adjacent legs 34a and 36a of the cam members 34 and 36, respectively, Fig. 2. Similarly, when the panel 25a is disposed in upright position, in abutting engagement with the adjacent edges of the panels 22a and 23a, it is disposed between the adjacent end edges of the panels 22a and 23a, and the respective overlying legs 35a and 37a of the cam members 35 and 37, respectively. The brace members 46—49 on the end panels 24a and 25a terminate in spaced relation to the adjacent vertical edges of the panels 24a and 25a, Figs. 2 and 4, in such position as to permit this latter positioning of the panels 24a and 25a relative to the panels 22a and 23a.

The cam members 34—37 and the respective overlying brace members 41—44 terminate at their upper edges in a plane disposed below the plane of the lower edges of the braces 27 and 28. The cam members 34—37 terminate at their lower ends in a plane disposed above the lower edges of the panels 24a—25a. The brace members 41—44 terminate at their lower edges in a plane disposed above the plane of the lower edges of the cam members 34—37, Fig. 1.

The walls 22—25 are pivotally interconnected by four hinges 51, 52, 53 and 54. Each of the hinges 51—54 embodies a substantially L-shaped pin 56, pivotally mounted at its opposite end portions in blocks 57 and 58. The blocks 58 of the hinges 53 and 54 are mounted on the lower end portions of the cam members 36 and 37, respectively, below the brace members 43 and 44. Similarly, the blocks 58 of the hinges 51 and 52 are mounted on the lower end portions of the cam members 34 and 35 below the braces 41 and 42. The blocks 57 of the hinges 51 and 53 are mounted on the outer face of the panel 24a in position wherein the pins 56 therein are disposed in substantially horizontal planes between the horizontal plane of the lower edges of the cam members 34 and 36 and the planes of the brace members 41 and 43. Similarly, the blocks 57 of the hinges 52 and 54 are mounted on the outer faces of the panel 25a in position wherein the pins 56 of the hinges 52 and 54 are disposed in substantially the same horizontal plane as that of the pins 56 of the hinges 51 and 53.

The lower corners of the panels 22—25 are rounded, Figs. 1 and 3 and the end edges of the panels 22a and 23a taper inwardly in a downward direction from the hinges 51—54, Figs. 1, 6 and 14, to such an extent that when the walls 22—25 are pivoted on the hinges 51—54 in such a manner that the upper ends thereof are moved outwardly away from each other, the lower edges of the walls 22—25 may pivot inwardly around the hinges 51—54 toward each other a distance sufficient to permit the upper end portions of the walls 22—25 to pivot outwardly relative to each other as shown in Figs. 4 and 6. In this pivotal movement of the walls 22—25, the lower edge portions of the side panels 22a and 23a pivot inwardly between the end panels 24a and 25a, and the end panels 24a and 25a may pivot inwardly toward abutting engagement with the adjacent edges of the lower end portions of the side panels 22a and 23a, Figs. 4, 6, 7 and 8.

The lower portions of the end edges 24 and 25 taper inwardly from the horizontal center lines of the pins 56 of the hinges 51—54, Figs. 3, 4 and 14, so as to afford clearance between that portion of each of those edges and the adjacent inner face of the respective adjacent leg 34b—37b of the cams 34—37, when the walls 22—25 are disposed in normal upright position. This clearance is sufficient to permit the side walls 22 and 23 to pivot on the hinges 51—54 from the fully closed position shown in Fig. 3 to a fully open position such as shown in Fig. 4, with the walls 24 and 25 remaining in normal upright position. After the side walls 22 and 23 have been moved to open position, the upper edge portions of the end walls 24 and 25 may be manually struck outwardly to thereby cause the latter walls to pivot into full open position such as shown in Fig. 6.

Molding plates 22b—25b may be mounted on the inner faces of the panels 22a—25a, respectively, in position to underlie and support the burial vault, or the like, to be molded in the form 20. The ends of adjacent ones of the strips 22b—25b are disposed in abutting engagement with the adjacent ends of the other strips 22b—25b, when the walls 22—25 are disposed in normal upright position. Each of the strips 22b—25b embodies an upwardly facing supporting surface 22c—25c which project inwardly and downwardly from the respective panels 22a—25a, and terminate at its lower edge in the horizontal plane of the longitudinal centers of the pins 56 of the hinges 51—54. Below the longitudinal center line of the pins 56 of the hinges 51—54, the adjacent end edges of the molding strips 22b—25b curve inwardly away from each other, Fig. 14, to thereby afford clearance so that the molding strips, as they pivot with the panels 22a—25a may pivot inwardly toward each other at the lower edges thereof and thereby are prevented from binding during the aforementioned pivotal movement of the walls 22—25.

Two actuating units 61 and 62, Fig. 1, are mounted on the end walls 24 and 25 for pivoting the side walls 22 and 23 outwardly and inwardly relative to each other around the hinges 51—54 to thereby expand and contract the form 20. Each of the actuating units 61 and 62, Figs. 1 and 3, embodies a plate 64 rotatably mounted on a pin 66 projecting outwardly from the outer face of the panel 24a and 25a, respectively, substantially centrally between the brace members 46 and 48, and the brace members 47 and 49, respectively and substantially centrally between the vertical edges of the panels 24a and 25a, respectively. Each of the plates 64 has a substantially square shaped socket 68 formed therein in longitudinal alignment with the respective pin 66, Fig. 3. Two elongated brace members 71 and 72 are mounted on the brace members 46 and 48 and the brace members 47 and 49, respectively, in overlying relation to the plates 64 of the actuating members 61 and 62, respectively. The braces 71 and 72 have an opening 74 formed therein which is disposed in longitudinal alignment with the respective socket 68 so that a handle or wrench may be inserted through the opening 64 into engagement with the socket 68 to thereby turn the plate 64.

Each of the actuating units 61 and 62 embodies two links 76 and 77, Figs. 3 and 4, each having one end pivotally connected to the respective plate 64 by suitable means such as a pin 79. The other ends of the links 76 and 77 are connected by ball and socket type connectors 81, Figs. 3 and 5, to the side walls 22 and 23. The connectors 81 are mounted on the brace members 41—44 on the side panels 22a and 23a, and project outwardly therefrom past the outer face of the panels 24a and 25a when the walls 24—25 are disposed in normal position, Figs. 1 and 3, and 5. The connectors 81 are disposed in substantially the same horizontal plane as the socket 68, Fig. 3. When the plates 64 are disposed in normal, form-closing position, Fig. 3, the ends of each link 76 and 77 opposite to the end attached to the respective connector 81 is disposed on the opposite side of the socket 68 from the connector 81, and is disposed below the horizontal plane of the socket 68, so that it is past center relative to the plate 64 and effectively latches the walls 22 and 23, and, therefore, walls 24 and 25 against outward pivotal movement relative to each other.

In the operation of our novel form, with the walls 22—24 disposed in normal upright position as shown in Figs. 1 and 3, handles, not shown, may be inserted into the sockets 68 in the actuating units 61 and 62 at each end of the form 20, and the plates 64 thereof turned in a counterclockwise direction as viewed in Fig. 3. Such movement of the plates 64 is effective to move the links 76 and 77 longitudinally outwardly away from each other into the position shown in Fig. 4, to thereby push the upper end portion of the side walls 22 and 23 outwardly away from each other, and thereby cause the side walls 22 and 23 to pivot on the hinges 51 and 52 and 53 and 54, respectively.

This pivotal movement of the side walls 22 and 23 is effective to swing the portions thereof disposed above the horizontal center lines of the hinges 51—54 outwardly away from each other, and thus similarly move the upper end portions of the cams 34—37. The outward movement of the upper end portions of the cam members 34—37 is sufficient to free the portions of the end walls 24 and 25 above the hinges 51—54 for outward pivotal movement. These latter walls may then be manually pivoted into open position, as shown in Fig. 6, wherein, from the upper edge thereof to a point just above the hinges 51—54, the upper end portions of the walls 24 and 25 are disposed in outwardly projecting position relative to the side walls 22 and 23 and the cam members 34—37. From a point a short distance above the hinges 51—54 downwardly to a point preferably in horizontal alignment with the pins 56, or, at least, a short distance thereabove, the adjacent edges 40 and 39 on the panels 24a and 25a and the cams 34—37, respectively, are in progressively greater contact with each other, when the walls 22—25 are in full open position.

With the housing 20 in open position, the burial vault, or the like, formed therein may be readily removed therefrom as, for example, by inverting the housing 20 and then lifting it from the burial vault. The housing 20 may then be turned back into normal position and the mechanism 61 and 62 again actuated to move the walls 22—25 back into normal position.

In this closing actuation of the walls 22—25, the handles, not shown, may be inserted in the sockets 68 and the plates 64 turned in a clockwise direction as viewed in Fig. 5. This is effective to pull the links 76 and 77 inwardly toward each other, from the position shown in Fig. 5 to the position shown in Fig. 4, to thereby swing the side walls 22 and 23 back into normal upright position. It will be remembered that the cam surfaces 39 are fully engaged with the surfaces 40 on the panels 24a and and 25a, as shown in Fig. 11, at a position in horizontal alignment with the hinges 51—54, or slightly thereabove. Hence, as the upper end portions of the cams 34—37 are swung inwardly with the upper end portions of the side walls 22 and 23, they are effective to cam the end walls 24 and 25 back into normal upright position as shown in Figs. 1 and 2. When returned to this latter position, the walls 24 and 25 are securely held therein by the engagement of the vertical edge portions thereof with the respective adjacent legs 34b—37b of the cam members 34—37 and the adjacent edge portions of the panels 22a and 23a, Figs. 2 and 12.

From the foregoing it will be seen that we have afforded a novel form which may be easily and quickly released from engagement with a burial vault or the like, formed therein.

Also, it will be seen that we have afforded a novel form wherein the walls thereof may be permanently hingedly connected to each other, and may be readily actuated relative to each other to open and close the form, in a novel and expeditious manner.

Thus while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. In a form for molding quadrangular objects, two side walls, two end walls, each of said walls having an upper edge portion, a lower edge portion, and two oppositely disposed side edge portions, means mounted on said lower edge portions of said walls hingedly mounting each of said side walls and end walls to both of said end walls and side walls, respectively, each of said walls being pivotable on said means and limited to movement between a substantially upright normal position and an open position wherein said walls are disposed at an outwardly opening acute angle to the horizontal, and means for moving said walls, said last mentioned means including elongated cam members extending from said side edge portions of said side walls in position to cammingly engage said end walls above said hinge means during movement of said side walls from said open position to said closed position to thereby simultaneously move said end walls toward said closed position.

2. In a form for molding quadrangular objects, two side walls, two end walls, said walls being hingedly mounted relative to each other for pivotal movement inwardly and outwardly relative to each other between closed and open positions, actuating means, including elongated rods movably mounted on said end walls and engaged with said side walls, for pivoting said side walls inwardly and outwardly relative to each other, and means projecting inwardly over and progressively slidably engageable with the edges of said end walls for pushing the latter inwardly toward each other and for engaging the outer surfaces of said end walls to lock said end walls in their closed position when said side walls reach their closed position during movement of said side walls inwardly toward each other.

3. In a form for molding burial vaults and the like, two end walls, two side walls, each of said walls having an upper edge portion, a lower edge portion, and two oppositely disposed side edge portions, a plurality of hinges mounted on said lower edge portions and hingedly connecting each of said end walls to each of said side walls, said walls having a substantially upright normal position and an upwardly and outwardly sloping open position, means mounted on said end walls and connected to said side walls for pivoting the latter on said hinges between said normal and open positions, and elongated means mounted on said side edge portions of said side walls and projecting inwardly therefrom, said elongated means being disposed on said side walls in such position that when said walls are disposed in said normal position said elongated means are disposed in longitudinally extending overlying relation to said end walls and, when said side walls are being moved from said normal position to said open position said elongated means progressively moves out of overlying relation to said end walls.

4. A form housing for molding burial vaults, and the like, comprising two end walls, two side walls, each of said walls having an upper edge portion, a lower edge portion, and two oppositely disposed side edge portions, a plurality of hinges mounted on said lower edge portions and hingedly connecting each of said end walls to each of said side walls, said walls having a substantially upright normal position and an upwardly and outwardly sloping open position, means mounted on said end walls and connected to said side walls for pivoting the latter on said hinges between said normal and open positions, and elongated cam members mounted on said side edge portions of said side walls and projecting inwardly therefrom, said elongated cam members being disposed on said side walls in such position that, when said walls are disposed in said normal position, said cam members are disposed in longitudinally extending overlying relation to said end walls and said side edge portions of said side walls are disposed in abutting engagement with the inner faces of said end walls, and, when said side walls are being moved from said open position to said normal position said cam members progressively move into overlying engagement with said side edge portions of said end walls above said hinges.

References Cited in the file of this patent

UNITED STATES PATENTS

| | | |
|---|---|---|
| 801,249 | Keagy | Oct. 10, 1905 |
| 887,814 | Johnson | May 19, 1908 |
| 1,379,965 | Cleland et al. | May 31, 1921 |